United States Patent [19]

Anderson et al.

[11] Patent Number: 5,010,807

[45] Date of Patent: Apr. 30, 1991

[54] RAVIOLI MACHINE

[75] Inventors: Jim L. Anderson; Terry W. Beltz, both of Marysville; Raymond E. Taylor, West Mansfield, all of Ohio

[73] Assignee: Nestec S.A., Vevey, Switzerland

[21] Appl. No.: 553,490

[22] Filed: Jul. 17, 1990

[51] Int. Cl.⁵ ............................ A21C 9/00; A23P 1/00
[52] U.S. Cl. .................... 99/450.6; 99/450.2; 99/450.7
[58] Field of Search ............... 99/450.1, 450.2, 450.6, 99/450.7, 450.8, 353, 355, 494; 425/112, 115, 122, 448, 511, 512, 515, 518, 327, 362

[56] References Cited

U.S. PATENT DOCUMENTS

| | | | |
|---|---|---|---|
| 1,844,142 | 2/1932 | Barili | 99/450.2 |
| 2,001,792 | 5/1935 | Lombi | 99/450.2 |
| 2,227,728 | 1/1941 | Lombi | 99/450.2 |
| 2,774,313 | 12/1956 | Lombi | 99/450.2 |
| 2,905,105 | 9/1959 | Lombi | 99/450.6 |
| 3,373,702 | 3/1968 | Quilici et al. | 99/450.5 |
| 3,605,641 | 9/1971 | Shuster | 99/450.7 |
| 4,160,634 | 7/1979 | Huang | 99/450.6 |
| 4,848,218 | 9/1989 | Battaglia | 99/450.7 |
| 4,941,402 | 7/1990 | D'Alterio | 99/450.6 |

Primary Examiner—Timothy F. Simone

[57] ABSTRACT

A ravioli machine having improved means for feeding and dispensing filling material is disclosed. The machine includes a reciprocating slide bar dispenser mounted adjacent a die roll for accurately depositing metered amounts of filling material into dough-lined mold cavities in the die roll. A flighted screw conveyor is provided for the transfer of filling material from a storage hopper to the slide bar dispenser.

8 Claims, 4 Drawing Sheets

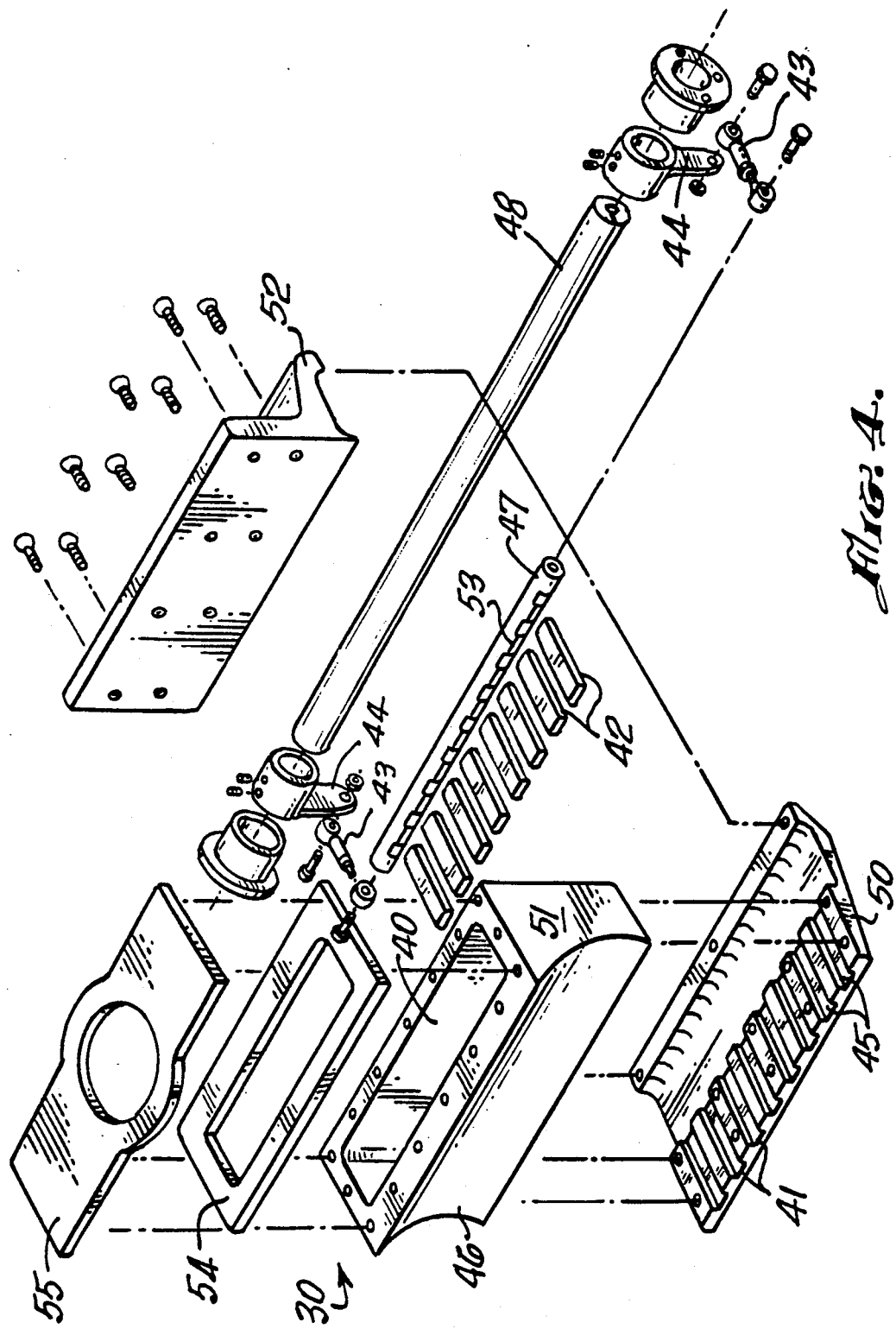

RAVIOLI MACHINE

BACKGROUND OF THE INVENTION

This invention relates to the production of ravioli and similar filled dough food products. More particularly, the invention relates to a machine for producing ravioli containing a thickened viscous filling material in a high speed commercial operation.

Basically in the production of ravioli, measured portions of filling material, such as cheese, ground meat, and the like, are introduced between two moving sheets of dough and the dough sheets are then pressed together to form pockets enclosing individual portions of filling material. Machines for producing ravioli are well known in the art. For example, U.S. Pat. Nos. 4,848,218 to Battaglia; 3,605,641 to Shuster; 2,774,313 to Lombi; and 2,227,728 to Lombi each disclosure a machine for producing ravioli. Typically such machines include a pair of dough hoppers, a filling material hopper located between the dough hoppers and means for forming dough sheets which are fed into the nip between two rolls, i.e., a die roll having a plurality of mold cavities and an anvil roll. A cutting roll is mounted adjacent the die roll to cut the sealed dough sheets into individual ravioli pieces. Filling material is introduced into dough-lined cavities in the die roll through tubular feeding nozzles mounted in the base of the filling material hopper, with the filling material being pumped from the hopper by gear pumps, air cylinders, pistons, and the like. In such prior machines, the tubular feeding nozzles have been mounted in a number of ways, for example, for vertical movement toward and away from the die roll (U.S. Pat. No. 2,774,313), in a fixed position adjacent the die roll (U.S. Pat. No. 3,605,641), and for oscillating movement (U.S. Pat. No. 4,848,218). The timing of all functions of such machines is typically controlled by conventional gearing to coordinate the discharge of filling material from the feeding nozzles into the dough-lined mold cavities in the die roll.

In recent years, the marketing of refrigerated pasta products, including ravioli, has become of increasing commercial significance. Ravioli produced for refrigerated marketing differs from that produced for marketing in a canned or frozen state in that the dough and filling components are formulated to have a lower moisture content to facilitate the production of ravioli having an extended shelf life. However, the use of such lower moisture components has given rise to a number of problems in the production of the ravioli in a high speed commercial operation using ravioli machines of the prior art. For example, the reduced moisture filling material has a viscosity significantly higher than that of conventional ravioli filling material. This high viscosity filling material is difficult to pump from the hopper in which it is stored into the mold cavities using the gear pumps, air cylinders, and pistons of prior art machines without damaging the texture of the filling material. In addition, the tubular feeding nozzles of prior art machines are not adapted to handle high viscosity filling material, making it difficult to accurately control the amount of filling material deposited and to prevent the deposit of the filling material onto portions of the dough sheet outside the dough-lined mold cavities.

SUMMARY OF THE INVENTION

The present invention provides an improved ravioli machine which overcomes the disadvantages of existing machines noted above. The ravioli machine of this invention includes a number of components incorporated in prior commercial ravioli machines, such as those sold by MBC Food Machinery Corporation, e.g. die roll, anvil roll, cutting roll, filling material hopper and dispenser. However, the machine of this invention, which is particularly well adapted for the production of ravioli having a thickened, viscous filling material, includes a number of modifications to ensure positive flow of the filling material from the filling material hopper without damaging the texture of the filling material and to accurately control the amount of filling material deposited in the dough-lined cavities of the die roll in a manner which avoids the deposition of filling material on the seal areas of the dough sheets. Moreover, a modified dough feed system is also provided, which permits the use of dough sheets having a reduced moisture content.

Thus, in the present ravioli machine, filling material is deposited in the cavities of the die roll by means of a reciprocating slide bar dispenser mounted adjacent the die roll. The dispenser includes a plurality of slide bars mounted for reciprocating movement toward and away from the die roll on a substantially horizontal plane tangent to the nip between the die roll and the anvil roll. Filling material is carried from the filling material hopper into the dispenser by means of a flighted screw conveyor mounted coaxially within the hopper to ensure the positive flow of filling material into the dispenser without damaging its texture or increasing its temperature to unacceptable levels. Dough sheets for the ravioli are provided by a pair of rolls of preformed dough sheets mounted adjacent opposite sides of the hopper. The timing of all functions of the machine is controlled by conventional gearing.

The present machine is particularly well suited for the production of ravioli containing a thickened, viscous filling material. However, it may also be used in the production of ravioli having conventional cheese, meat, vegetable, etc. filling materials.

DESCRIPTION OF THE DRAWINGS

FIG. 4 is an exploded perspective view of the filling material dispenser.

DESCRIPTION OF THE INVENTION

Figure 1:
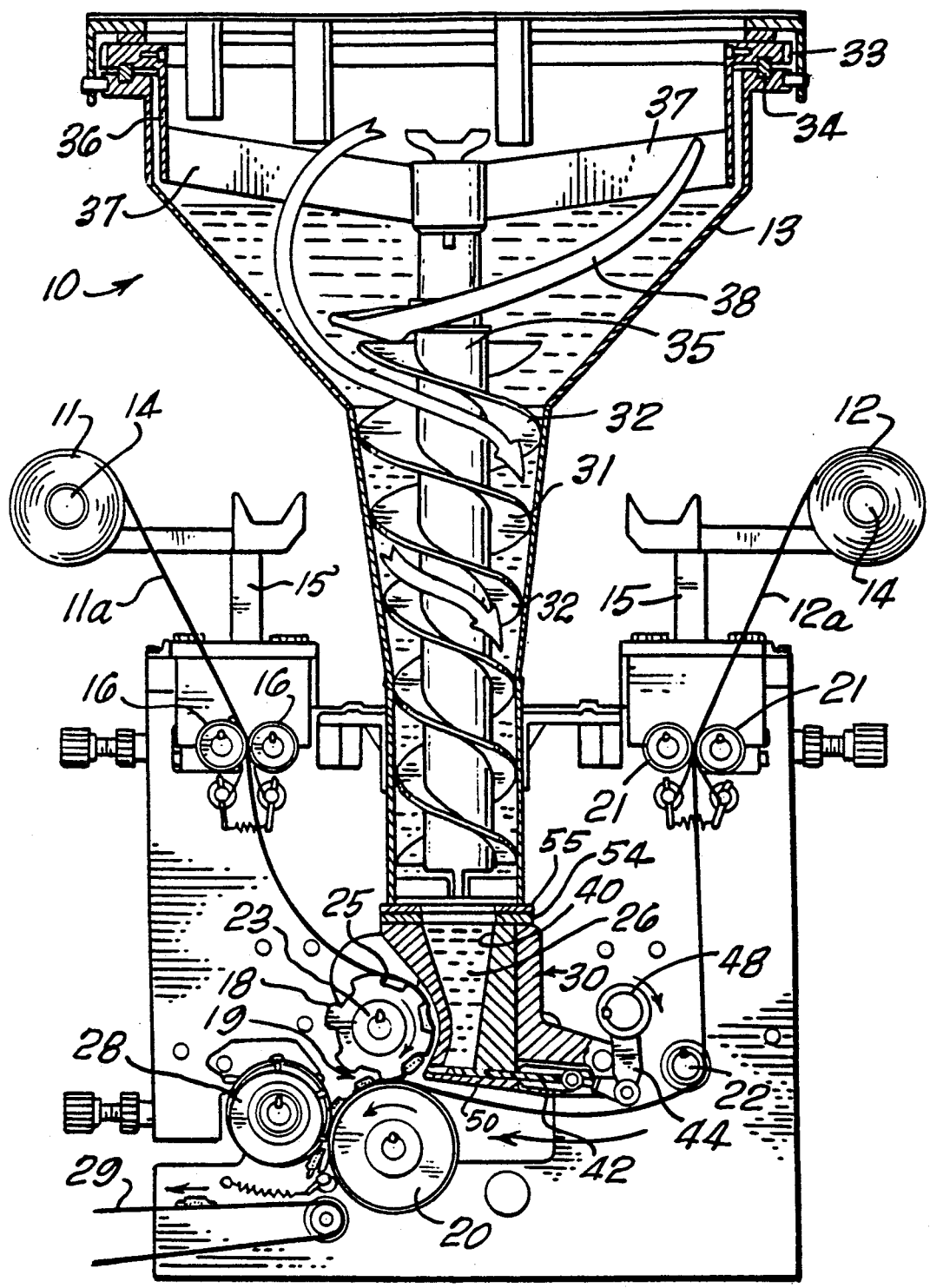
FIG. 1 is a side elevation, partly in section, of the ravioli machine of this invention, with the side plate of the machine removed.

Referring now to the drawings, the ravioli machine of the present invention, which is generally denoted by reference numeral 10, is mounted on a suitable frame (not shown) and includes a pair of dough rolls 11 and 12 and a filling material hopper 13 mounted between the rolls. The dough rolls 11 and 12 comprise preformed elongated dough strips of predetermined width wound on mandrels 14 which are supported on arms 15 secured to the frame.

The dough strip 11a from roll 11 passes through a pair of driven rolls 16 for sizing to a predetermined reduced thickness, around female die roll 18 and into the nip 19 formed by die roll 18 and anvil roll 20 mounted adjacent die roll 18, to form the top dough sheet of the ravioli. Dough strip 12a from roll 12 passes through a pair of driven rolls 21 for sizing to a predetermined reduced thickness, and around idler roller 22 into nip 19 to form the bottom dough sheet of the ravioli. The width of both dough strips 11a and 12a is such that the strips extend over the axial length of die roll 18.

Figure 2:
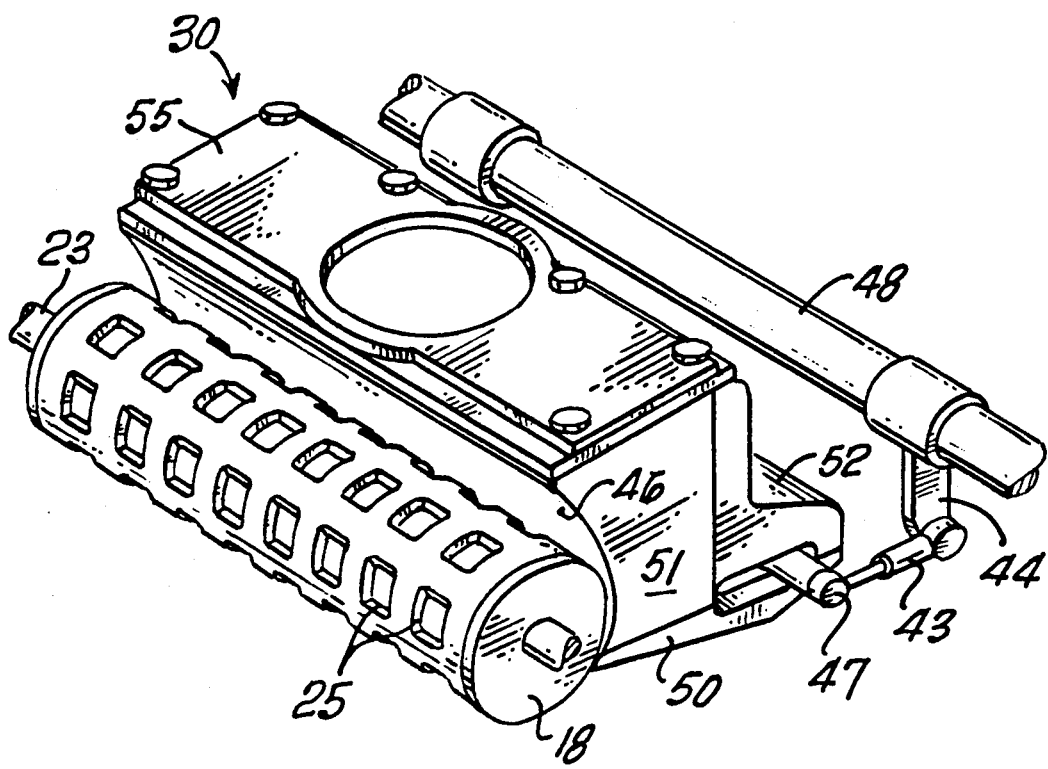
FIG. 2 is a perspective view of the die roll and filling material dispenser of the ravioli machine.
Figure 3:
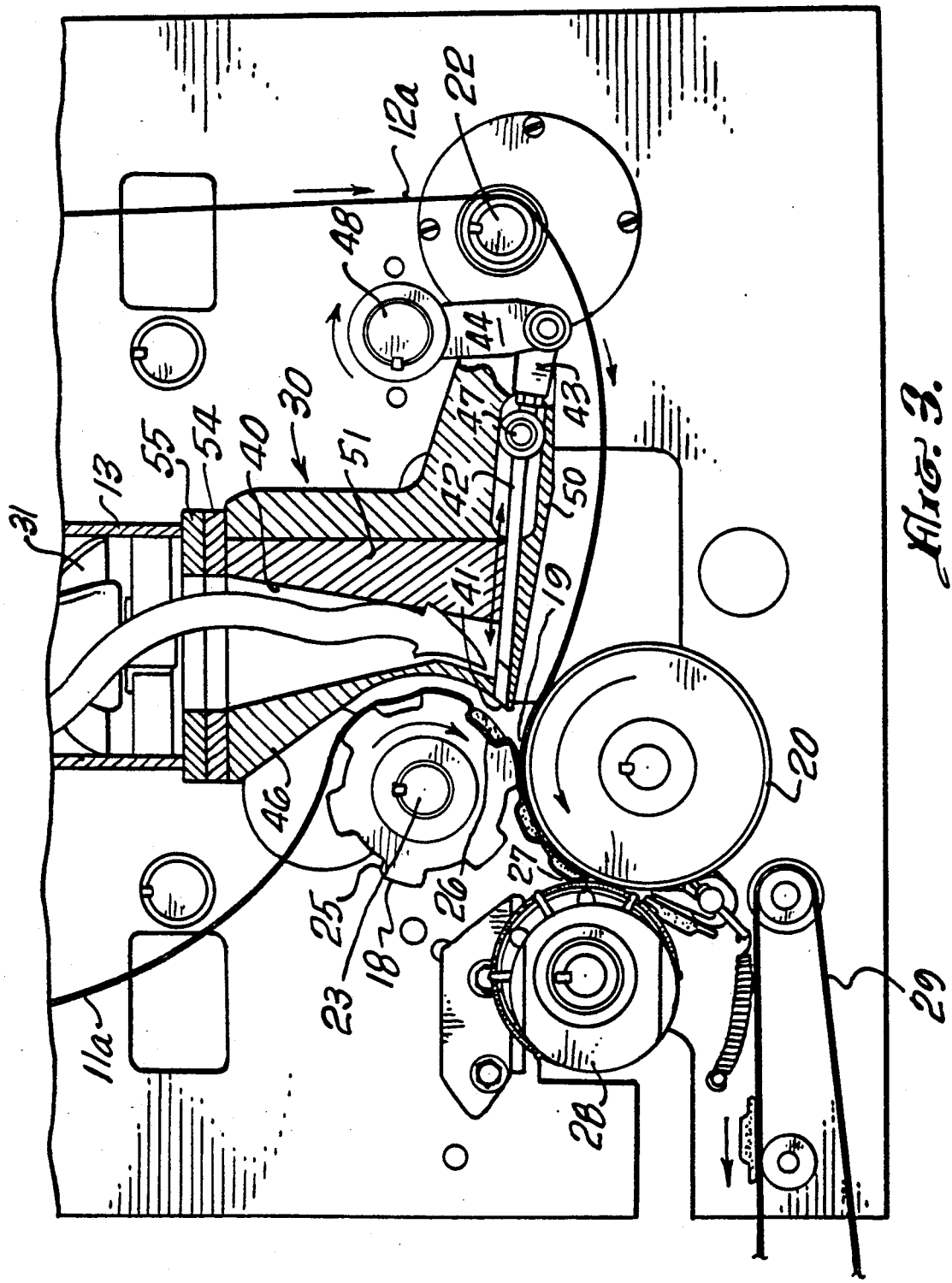
FIG. 3 is an enlarged view of the forming section of the machine shown in FIG. 1.

As shown in FIGS. 1 and 2, cylindrical die roll 18 which is mounted for rotation on shaft 23, has six longitudinal rows of die cavities 25 spaced equidistant around the periphery of the roll, with each longitudinal row containing eight die cavities. The die cavities can be of any suitable size and shape, such as square, rectangular, circular, etc., depending on the desired configuration and size of the ravioli to be produced. The number of die cavities in each longitudinal row and the number of rows around die roll 18 may of course vary, depending on such factors as the size of the die cavities, the production rate desired, and the like.

As the die roll 18 is rotated in the direction indicated by the arrow, filling material 26 is deposited into each of the dough-lined mold cavities in the longitudinal row of cavities immediately preceding nip 19. Dough sheets 11a and 12a, and filling material 26 are then carried through nip 19 where the ravioli is shaped and the dough sheets sealed together. The sealed and filled dough sheets then proceed through a second nip 27 formed by anvil roll 20 and cutting roll 28 where the sheet is cut into individual ravioli pieces which are transferred to an endless takeaway conveyor 29 for processing and packaging. Cutting roll 28 is provided with a grid of intersecting longitudinal and circumferential knife blades on the surface thereof which are adapted to cut the continuous sealed and filled dough sheets passing through nip 27 both between adjoining rows of ravioli and longitudinally between adjoining ravioli in each row.

The timing of all functions of the machine is controlled by gearing (not shown) in which a single drive motor (not shown) drives all of the rollers and shafts through sprocket and chain drives. The positioning and timing of the various gears is within the skill of those in the machine art.

(Filling material for the ravioli, such as cheese, ground meat, ground vegetables, and the like, including thickened, high viscosity filling material (e.g. cheese filling having a moisture content in the range of 40%–50%) is carried from filling material hopper 13 into filling depositor 30 by rotationally driven conveyor screw 31 mounted coaxially in the hopper. Conveyor screw 31 is provided with flights 32 which are sized so that the edges of the flights pass in close proximity to both the converging intermediate sidewalls and the cylindrical lower sidewalls of the funnel-shaped hopper. The screw conveyor is rotated continually by suitable gearing means, including ring gear 33 which meshes with a pinion gear (not shown) driven by a second motor (not shown) mounted on the frame. Ring gear 33 is supported on suitable bearings 34 and is operably connected with shaft 35 of the conveyor screw by ring 36 and arms 37. Screw conveyor 31 is continuously rotated at relatively low revolutions per minute, to ensure positive flow of filling material from the hopper to depositor 30 without significant pressure or heat buildup or shear. Arcuate baffle 38 is secured to shaft 35 adjacent the upper end thereof to facilitate movement of the filling material into the upper end of the conveyor screw.

Filling material from hopper 13 is discharged into filling depositor 30 mounted on the base of the hopper in juxtaposition with die roll 18. Depositor 30 is provided with an arcuate face 46 which enables the depositor to be mounted in close proximity to die roll 18. Filling material conveyed from hopper 13 into chamber 40 is discharged from chamber 40 into a longitudinal row of the dough-lined mold cavities of die roll 18 through a longitudinal row of openings 41 in the base of the arcuate face 46 of the depositor by means of slide bars 42. The number end spacing of openings 41 corresponds to the number of die cavities per longitudinal row in the die roll and the spacing between the centers of adjoining die cavities in the row. A plurality of parallel channels 45 are provided in the base of depositor 30, with the channels extending through to the arcuate face of the depositor to form openings 41. A slide dispenser bar 42 is provided in each of the channels for moving a predetermined amount of filling material from the base of chamber 40, through openings 41 into a longitudinal row of dough-lined mold cavities on die roll 18. Dispenser bars 42 are secured to rod 47 and are mounted for reciprocating movement in channels 45 toward and away from the die roll on a substantially horizontal plane (e.g. $\pm 10°$) tangent to nip 19. Rod 47 is connected by linkages 43 and 44 to rotable shaft 48 which is rotatably driven by the drive motor (not shown) through gearing. The reciprocatory movement of the dispenser bars 42 and the rotation of the die roll 18 are synchronized by the gearing to coordinate the discharge of filling material from depositor 30 into the center of the dough-lined cavities of the die roll, with the dough sheet at the trailing edge of the mold cavity being rotated against the beveled discharge end of the dispenser bar as it is being retracted to remove any filling material which may adhere to the bar.

As shown in FIG. 4, depositor 30 includes a base plate 50, the front portion of which includes a plurality of parallel channels 45 terminating in openings 41, and the rear portion of which is recessed to accommodate rod 47. Front block 51, which includes filling chamber 40, is secured to base plate 50 by any suitable means such as bolts, screws, etc. Back plate 52, which has a recessed base, is removably secured to front block 51 and base plate 50 over the rear portion of the base plate, with the recessed portions of the base plate and the back plate defining a chamber in which rod 47 is disposed for reciprocal movement. Dispenser bars 42, which are mounted for reciprocating movement in channels 45, are disposed in slots 53 in rod 47 and secured thereto by means of a set screw. A manifold plate 54 and a sealing plate 55 are provided at the upper surface of depositor 30 for attachment to the base of filing material hopper 13. Rod 47 is operably connected to shaft 48 through linkages 43 and 44 whereby rotation of shaft 48 effects reciprocating movement of rod 47 and dispenser bars 42 toward and away from the die roll mounted adjacent depositor 30.

Preferably the components of depositor 30 are molded from an inert polymer material, such as nylon molding powder or Delrin, a polyethylene/acrylic acid crosslinked graft polymer, which have good dimensional stability, good abrasion resistance and good resistance to friction In operation, when the slide bars are in a retracted position, filling material from chamber 40 fills channels 45 in front of each slide bar. When the slide bars are moved to their extended position, by the rotation of shaft 48 which carries linkages 43 and 44, filling material in the channel in advance of a slide bar is carried by the slide bars to the center of an adjacent dough-lined mold cavity on the die roll. Continued rotation of shaft 48 effects the return of the slide bars to their retracted position for repetition of the cycle. It will be appreciated that the volumetric space defined by the channel in front of a slide bar in its retracted position provides the amount of filling material desired in the finished ravioli.

What is claimed is:

1. In a machine for producing ravioli having a filling material hopper, a female die roll having a plurality of mold cavities for forming the ravioli, an anvil roll mounted adjacent the die roll to define a nip therebetween, means for feeding a first dough sheet over the die roll and into said nip, means for feeding a second dough sheet into said nip, and dispensing means for feeding a filling material from said hopper into a dough-lined mold cavity in the die roll whereby the dough sheets are sealed together around individual portions of filling material by passage through said nip, the improvement in which said dispensing means comprises a slide bar dispenser in communication with the filling material hopper mounted in juxtaposition with said die roll, said dispenser having a longitudinal row of openings in the surface of the dispenser adjacent the nip between the die roll and the anvil roll, a plurality of slide bars in communication with said openings, said slide bars being mounted for reciprocating movement toward and away from the die roll on a substantially horizontal plane tangent to said nip, means for effecting reciprocatory movement of said slide bars, and means for coordinating the reciprocatory movement of the slide bars with the rotation of said die roll whereby filling material is discharged from the openings in the dispenser into the dough-lined mold cavities on said die roll immediately preceding said nip.

2. The machine defined in claim 1 in which the slide bars are mounted in the dispenser for reciprocatory movement at an angle of not more than ±10° to the horizontal.

3. The machine defined in claim 1 in which the surface of the dispenser adjacent the die roll is arcuate and has a longitudinal row of openings located at a point intermediate the central horizontal diameter of die roll and the horizontal plane of the nip.

4. The machine defined in claim 1 in which the die roll has a plurality of longitudinal rows of mold cavities around the circumference thereof, with the number and spacing of the openings in said dispenser corresponding to the number and spacing of mold cavities in said longitudinal rows on the die roll.

5. The machine defined in claim 1 in which the filling material hopper includes a vertically mounted conveyor screw and means for rotating said conveyor screw to convey filling material from said hopper to said slide bar dispenser.

6. The machine defined in claim 1 in which a pair of preformed elongated dough sheets are mounted on opposite sides of said filling material hopper to provide said first and second dough sheets.

7. The machine defined in claim 1 in which said slide bar dispenser includes a base plate having a plurality of channels therein terminating in the orifices in the outer surface of the dispenser adjacent the die rolls, and a slide bar is mounted in each of said channels for reciprocatory movement toward and away from said die roll, with the end of each slide bar adjacent the die roll being beveled outwardly.

8. The machine defined in claim 1 in which the means for effecting reciprocatory movement of the slide bars comprises an axial rod to which the slide bars are secured with said axial rod being operably connected to a rotatable shaft which is driven by gearing to coordinate the reciprocatory movement of the slide bars with the rotation of said die roll.

* * * * *